US008515428B2

(12) United States Patent
Lu et al.

(10) Patent No.: US 8,515,428 B2
(45) Date of Patent: Aug. 20, 2013

(54) METHOD AND DEVICE FOR RADIO CELL CHANGE DUE TO ENERGY SAVING IN A MOBILE COMMUNICATION NETWORK

(75) Inventors: Yang Lu, Düsseldorf (DE); Peter Wild, Krefeld (DE); Alexej Kulakov, Düsseldorf (DE); Jürgen Caldenhoven, Düsseldorf (DE)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 13/197,332

(22) Filed: Aug. 3, 2011

(65) Prior Publication Data

US 2012/0046035 A1 Feb. 23, 2012

(30) Foreign Application Priority Data

Aug. 20, 2010 (EP) ..................................... 10173558

(51) Int. Cl.
*H04W 36/00* (2009.01)

(52) U.S. Cl.
USPC .......................................... 455/436; 370/338

(58) Field of Classification Search
USPC ........................................... 455/436; 370/338
See application file for complete search history.

(56) References Cited

U.S. PATENT DOCUMENTS

| 5,982,757 | A | * | 11/1999 | Curtis et al. | ................... | 370/328 |
| 6,108,563 | A | * | 8/2000 | Shishino | ........................ | 455/560 |
| 2007/0147298 | A1 | * | 6/2007 | Miao et al. | ..................... | 370/331 |
| 2009/0116448 | A1 | * | 5/2009 | Nam et al. | ..................... | 370/331 |
| 2010/0002667 | A1 | * | 1/2010 | Lin | ............................... | 370/338 |
| 2010/0261476 | A1 | * | 10/2010 | Wu et al. | ........................ | 455/444 |

* cited by examiner

*Primary Examiner* — Marcos Batista
(74) *Attorney, Agent, or Firm* — International IP Law Group, PLLC

(57) ABSTRACT

There is provided a method for a mobile communication device registering in second radio cell of a mobile communication network based on a deactivation of a first radio cell in which the mobile communication device was located. An exemplary method comprises determining a random time interval by the mobile communication device. An expiration of the random time interval is determined starting from a predetermined point in time. The exemplary method also comprises registering in the second radio cell, when the expiration of the random time interval has been determined.

14 Claims, 1 Drawing Sheet

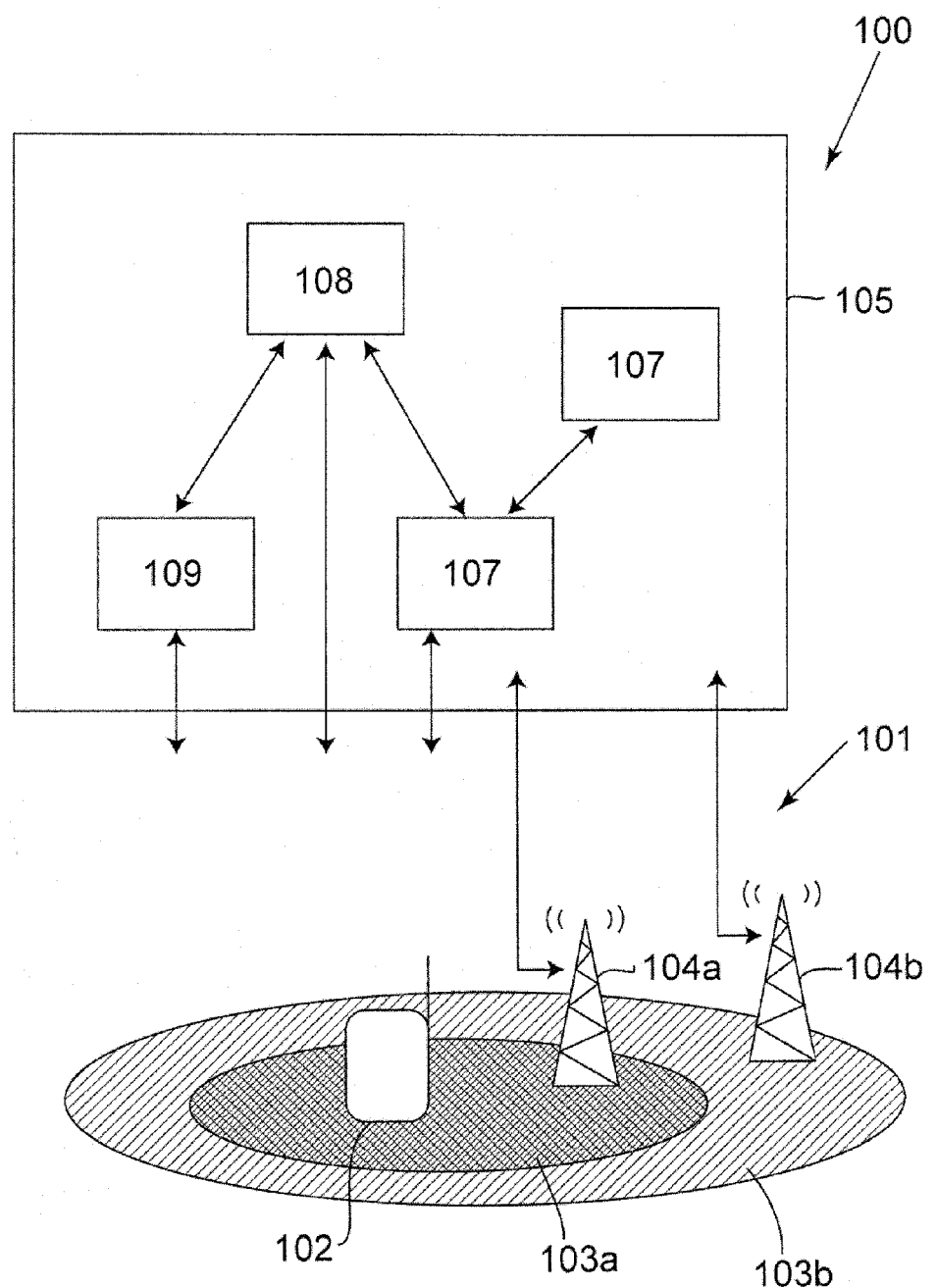

METHOD AND DEVICE FOR RADIO CELL CHANGE DUE TO ENERGY SAVING IN A MOBILE COMMUNICATION NETWORK

CROSS-REFERENCE TO RELATED APPLICATION

This application claims priority to European (EP) Patent Application No. 10173558.7, filed on Aug. 20, 2010, the contents of which are incorporated by reference as if set forth in their entirety herein.

BACKGROUND

Mobile communication devices wirelessly connect to mobile communication networks via radio access networks, which are usually configured as radio cellular networks comprising a plurality of radio cells. Each radio cell covers certain geographical area and is served by a base station which forms the access point to the radio access network in the radio cell.

In modern mobile communication system, some geographical areas may be covered by multiple radio cells. Such area may be covered by a first radio cell, which is covered totally by a larger second radio cell of the same radio access technology. In this configuration, the second radio cell may provide continuous coverage of the area, while the first radio cell increases the capacity of a special subarea, such as a hotspots, homes or business mall or offices. Such radio cells are particularly known as so-called Micro Radio cells, Pico Radio cells and Femto Radio cells.

Similarly, a first radio cell of a first radio access network may be covered by a second radio cell implementing a different radio access technology than the first radio cell. In particular, the second radio cell may implement a legacy radio access technology and may be deployed to provide basic coverage of voice or lower-speed data services, while the first radio cell enhances the capability of the area to support high-speed data or multimedia services.

In view of the aforementioned configurations in which one geographical area is covered by two radio cells, the document TR 32.826 (version 10.0.0) of the 3rd Generation Partnership Project (3GPP) suggests to deactivate radio cells in order to save energy. In the aforementioned first scenario, the first radio cell may be deactivated in case that light traffic or no traffic is detected in the first radio cell, and in the second scenario, the first radio cell may be deactivated in case that no high-speed data or multi-media traffic is detected in the radio cell.

One further approach for energy saving suggested in TR 32.826 is to concentrate the load into a few selected radio cells that remain active during low traffic demand periods with increased coverage area and to deactivate the remaining less loaded radio cells. These radio cells may only be activated in peak time situations in which each radio cell may cover a smaller geographical area to cope with peak time traffic demand.

When a radio cell is deactivated, mobile communication devices which are located in the radio cell and are engaged in an active speech or data connection with the mobile communication system have to perform a handover procedure to change into a new radio cell covering the geographical area of the radio cell to be deactivated. In the handover procedure, the connection is switched over from the old radio cell to be deactivated to the new radio cell such that it can be continued therein.

Using standard procedures, mobile communication devices in idle mode, i.e. mobile communication devices that are switched on but do not have any established speech or data connection to the mobile communication network, will recognize the deactivation of a radio cell they are camped on due to measurements of the signal strength in their serving radio cell, which are performed essentially continuously. When those mobile communication devices determine that the radio cell no longer exists, they will select a new radio cell covering the relevant geographical area and will try to register in such radio cell by exchanging corresponding messages with the mobile communication network.

All mobile communication devices which were located in the deactivated radio cell will perform the registration procedure in a new radio cell essentially simultaneously. This will lead to peak signaling loads in the mobile communication network. As a consequence, the mobile communication system may become overloaded and additional efforts are needed to dimension the mobile communication network to cope with the peak signaling load.

SUMMARY

The subject innovation relates to the change of a radio cell in a mobile communication network, particularly to a radio cell due to energy saving in such network. More specifically, the subject innovation relates to a method for changing a radio cell in a mobile communication network. In addition, exemplary embodiments are related to a mobile communication device for connecting to a mobile communication network suitable for performing the method.

The subject innovation may reduce in a mobile communication system peak signaling loads which are due to mobile communication devices in idle mode registering in a new radio cell when the radio cell they camp on is deactivated.

The subject innovation relates to an exemplary method for a mobile communication device registering in second radio cell of a mobile communication network based on a deactivation of a first radio cell the mobile communication device was located in. The exemplary method comprises the following steps:

the mobile communication device randomly determining a time interval, the mobile communication device determining an expiration of the time interval starting from a predetermined point in time, and the mobile communication device registering in the second radio cell, when the expiration of the time interval has been determined.

Exemplary embodiments of the subject innovation also relate to a Mobile communication device configured to register in a second radio cell of a mobile communication network based on a deactivation of a first radio cell the mobile communication device was located in. The mobile communication device is adapted to randomly determine a time interval and to determine the expiration of the time interval starting from a predetermined point in time, and the mobile communication device is further adapted to register in the second radio cell only after the expiration of the time interval has been determined, if it has been registered in the first radio cell before.

In accordance with an exemplary embodiment, mobile communication devices register in a new radio cell only after the expiration of a time interval is determined. The time interval is determined randomly so that plural mobile communication devices determine different time intervals. Thus, plural mobile communication devices register in their new radio cell not simultaneously, but in different points in time, even if the radio cell change is triggered by an event affecting the mobile communication devices essentially simultaneously, such as the deactivation of a radio cell the mobile communication devices camp on. As a consequence, peak signaling loads due to the registration of the mobile communication devices in a new radio cell.

It may be useful to restrict the use of the random-based time interval to selected situations, such as the deactivation of a radio cell, since in other situations the radio cell change would be unnecessarily complicated, when the time-interval would have to be used. Therefore, in one exemplary embodiment of the method and the mobile communication device, the mobile communication device randomly determines the time interval after having received a predetermined message from the mobile communication network. Thus, by sending the predetermined message, the mobile communication network can command the mobile communication device to select the time interval, while such time interval may not be selected, when no message is received.

In a further exemplary embodiment of the method and the mobile communication device, the predetermined message notifies the mobile communication device that the first radio cell will be deactivated. In this exemplary embodiment, it is ensured that radio cell changes due to the deactivation of a radio cell are made using the randomly selected time interval.

In a further exemplary embodiment of the method and the mobile communication device, the time interval is randomly selected based on a time T indicated in the message. In particular, the time interval may be randomly selected such that it has a length less than or equal to the time. These exemplary embodiments may allow the mobile communication network to affect the determination of the time interval in the mobile communication device. For instance, the mobile communication network may select the time T based on an estimated number of mobile communication devices located in the radio cell to be deactivated.

One exemplary embodiment of the method and the mobile communication device provides that the predetermined point in time corresponds to a point in time, when the mobile communication device determines that the first radio cell is no longer available. It is an advantage of this exemplary embodiment, that the determination of the point in time is independent of any absolute time basis within the mobile communication device. In addition, the determination of the point in time can be made without receiving the predetermined message.

In alternative exemplary embodiments of the method and the mobile communication device, the predetermined point in time corresponds to the point in time, when the message is received in the mobile communication device, and/or the predetermined point in time being specified in the message.

In one exemplary embodiment of the method and the mobile communication device, the mobile communication device blocks an initiation of mobile-originating speech and/or data connections after having received the message notifying about the deactivation of the first radio cell. In a further exemplary embodiment of the invention, within a time period before the deactivation of the first radio cell, the mobile communication network rejects requests for establishing speech and/or data connections terminating at the mobile communication device.

Some exemplary embodiments may prevent that within certain time period before the deactivation of the first radio cell, a speech and/or data connection involving the mobile communication device is initiated, which may have to be switched over to a new radio cell by a handover procedure. Thus, the number of handovers is reduced, which become necessary due to the deactivation of the radio cell and which require extensive signaling between the relevant mobile communication devices and the mobile communication network and within the mobile communication network. Thus, the signaling load in the mobile communication network is further reduced.

Furthermore, in one exemplary embodiment of the method and the mobile communication device, the predetermined message includes a list of radio access technologies, the mobile communication device selecting the second radio cell such that it implements a radio access technology included in the list. Hereby, it can be determined to which radio access technology the second cell belongs, in which the mobile communication device registers. The mobile communication device may comprise a default mechanism for selecting a radio access technology. This default mechanism can be overwritten of influences via the list sent to the mobile communication device.

Moreover, a mobile communication system according to the subject innovation comprises a mobile communication device of the type described herein and which further comprises a mobile communication network adapted to transmit a predetermined message to the mobile communication device before it deactivates the first radio cell. The message notifies the mobile communication device that the first radio cell will be deactivated.

BRIEF DESCRIPTION OF THE DRAWINGS

The aforementioned and other aspects of the invention will be apparent from and elucidated with reference to the embodiments described hereinafter making reference to the accompanying drawing. In the drawing, FIG. 1 is a block diagram showing a mobile communication system comprising an energy saving function.

DETAILED DESCRIPTION OF SPECIFIC EMBODIMENTS

FIG. 1 schematically shows selected components of a mobile communication network 100, which may play a role in the implementation of the subject innovation described in the following.

The mobile communication network 100 comprises a radio access network (RAN) 101 to which mobile communication devices 102 connect wirelessly to access the mobile communication network 100. The RAN includes a plurality of radio cells 103a,b. Each radio cell 103a,b covers certain a geographic area of the service area of the mobile communication network 100. A radio cell 103a,b is served by a base station 104a,b, which serves as an access point to the mobile communication network 100 in the radio cell 103a,b.

The base stations 104a,b of the RAN 101 may implement the same radio access technology (RAT). In one embodiment, the base stations 104a,b may be configured as Evolved NodeBs (eNodeBs) according to the LTE specifications of the 3GPP. Likewise, the base stations may be configured as NodeBs according the UMTS specifications or as Base Transceiver Stations (BTS) according to the GSM specifications of the 3GPP providing. Furthermore, in one implementation, the RAN 101 may implement different RATs. This means that the RAN 101 comprises base stations 104a,b of different types and each type corresponds to one RAT. For instance, the RAN 101 may include eNodeBs as well as NodeBs and/or BTS. This may be done in the same way as it is described herein with respect to the radio cell 103a.

The mobile communication devices 102 used in a mobile communication network 100 providing different RATs may be configured to access base stations 104a,b of different types such that they can connect to a base station 104a,b of one type, when a base station of another type is not available, and can select among different RATs, when they are located in a geographic area simultaneously covered by radio cells 103a,b of different RATs.

In FIG. 1, two radio cells 103a,b are shown, which are served by base stations 104a,b. Furthermore, one radio cell 103b totally covers the geographic area of the other radio cell 103a. This configuration may be permanent or temporary. A temporary coverage of the geographic area of the radio cell 103a by the radio cell 103b may be provided, when the base station 104b allows for a dynamic configuration of the coverage area of the radio cell 103b such that a smaller coverage area which does not or only partly include the geographic area of the radio cell 103a can be extend to totally include the geographic area of the radio cell 103a. The overlapping radio cells 103a,b depicted in FIG. 1 may implement the same RAT or different RATs.

For the reason of energy saving in the mobile communication network 101 it is provided that the radio cell 103a is deactivated temporarily. For deactivating the radio cell 103a, a radio part of the base station 104a serving the radio cell 103a may be powered off, or the base station 104a may restrict the usage of its physical resources by mobile communication devices 102, particularly the radio resources, in another way.

As in the configurations initially described, the smaller radio cell 103a may increases the capacity of a special subarea, such as a hotspot, a home or a business mall or office, of the greater radio cell 103b implementing the same RAT. In this scenario, the smaller radio cell 103a may be deactivated in case of light or no traffic, which may occur, when the relevant subarea is less frequented by mobile users.

In a further configuration, which also has been mentioned initially, the smaller radio cell 103a may provide high-speed data or multimedia services requiring high bandwidth connections within a subarea of a greater radio cell 103b implementing another RAT, particularly a legacy RAT providing a lower bandwidth and providing basic voice or medium/low-speed data services. Here, smaller radio cell 103a may be deactivated in case no high-speed or multi-media traffic is detected in the radio cell 103a.

In a further scenario already described before, the radio cell 103b may remain active during low traffic demand periods with increased coverage area to concentrate the load into this radio cell 103b, while the radio cell 103a is deactivated. The radio cell 103b may only be activated in peak-time situations in which each radio cell 103a,b may cover a smaller geographical area to cope with peak-time traffic demand.

Moreover, there may be further scenarios in which one radio cell 103a is temporarily deactivated and the traffic in the deactivated radio cell 103b is absorbed by a further radio cell 103b of the RAN 101. The skilled person understands that the subject innovation can also be used in such scenarios and is not limited to the configurations described before. For instance, the geographic area of the radio cell 103a that is temporarily deactivated may be covered by more than one further radio cell 103b that remains active, when the radio cell 103a is deactivated. Each further radio cell 103b may cover the radio cell 103a totally or partly. Furthermore, it is possible to deactivate multiple coherent radio cells.

The mobile communication network 100 further comprises a core network (CN) 105, which is connected to the RAN 101. In FIG. 1, arrows leaving or entering the CN 105 indicate that the components assigned to the arrows can communication with the CN 105 (for units in the RAN 101) or the RAN (for units in the CN 105).

The CN 105 includes at least one mobility management unit 106, which keeps track of the location of the mobile communication devices 102 in its service area. When a mobile communication device 102 registers in the mobile communication network 100, the mobile management unit 106 creates an entry for the mobile communication device 102 and stores its location in the entry. Then, the mobility management unit 106 keeps tracking the location of the mobile communication device 102 on the level of the base stations 104a,b, if the mobile communication device 102 is engaged in an active speech and/or data connection to the mobile communication network 100 or at the level of so-called tracking areas in case the mobile communication device 102 is in idle mode, and maintaining the through-connected connection path is not needed.

A tracking area comprises one radio cell or a group of a radio cells, and each time, a mobile communication device 102 changes from one tracking area to another, it notifies the mobile communication network 100 and particularly the mobility management unit 106, such that the mobility management unit 106 can update the location of the mobile communication device 102 in the entry assigned thereto. This procedure is usually called tracking area update, location area update or the like.

Preferably, the radio cell 103a, that can be deactivated, forms one tracking area. Hereby, the mobility management unit 106 can identify the mobile communication devices 102, which are located in the radio cell 103a to be deactivated. If multiple radio cells 103a are to be deactivated, such cells may form one or more tracking areas.

In one embodiment, the mobility management unit 106 is configured as a mobility management entity (MME) according to the LTE specification of the 3GPP. In other mobile communication networks 100, there may be other units performing the mobility management functions of the mobility management unit 106. In particular, the mobility management unit 106 may be a Mobile Switching Centre (MSC) or a Serving GPRS Support node (SGSN) in a CN 105 according to the GSM or UMTS specification.

A further component of the CN 105, which is shown in the depiction of FIG. 1, is a registration server 107 including a data base storing permanent user data of subscribers of the mobile communication network 100. In particular, the registration server 107 stores the subscriber profiles comprising information about the services applicable, authentication information assigned to the users and further user related information. In addition, the registration server 107 records the location of the users on the level of the mobility management unit 106 in the user entries stored in the data base. Thus, for a user the mobility management unit 106 is registered which serves the area the mobile communication device 102 of the user is located in. For this purpose, the mobility management unit 106 notifies the registration server 107, when the mobile communication device enters or leaves its service area. If the CN is configured according to the LTE specification, the registration server 107 is configured as a Home Subscription Server (HSS). In a CN 105 according to the UMTS or GSM specification, the registration server 107 is a Home Location Register (HLR).

In addition to the mobility management unit 106 and the registration server 107, the CN 105 includes further network nodes, which are not shown in the Figures and which particularly form stations in a connection path to a mobile communication device 102. As it is the case, if the mobility management unit 106 is configured as an MSC or a SGSN, the connection to a mobile communication device 102 may be established via a connection path including the mobility management unit 106. However, also in this case, there may be further nodes of the CN 105 in the connection path. Likewise, the mobility management unit 106 may not be included in a connection path to a mobile communication device 102, but the connection may be established exclusively through further nodes of the CN 105. This is particularly the case, if the mobility management unit 106 is configured as an MME.

The mobility management unit 106 may be involved in the establishment of a speech and/or data connection to a mobile communication device 102. When a mobile-terminating connection is to be established due to a call and/or a data connection arriving in the mobile communication network 100, the mobile management unit 106 notifies the mobile communication device 102, if it is in idle mode. For this purpose, the mobility management unit 106 serving the mobile communication device 102 is informed about the mobile-terminated connection, at first. Among the available mobility management units 106 in the CN 105, the responsible mobility management unit 106 may in general be identified using the aforementioned entry assigned to the mobile communication device 102 in the registration server 107. Only, when the connection request is received from a mobile communication device 102 registered in the same mobility management unit 106, the request to the registration server may be dispensed with. Upon receipt of the connection request, the mobility management unit 106 controls the RAN 101 to broadcast a paging message within the radio cells 103a,b belonging to the tracking area the mobile communication device 102 is located in. When the mobile communication device 102 receives the paging message, it tries to establish an active connection to the mobile communication network 100 in order to receive the mobile-terminating speech and/or data connection.

The mobile communication device 102 depicted in FIG. 1 initially camps on the radio cell 103a, which is to be deactivated. In general, there may be more than one mobile communication device 102 camping on the radio cell, when it is deactivated. However, in FIG. 1 only one mobile communication device 102 is shown by way of example and it is to be understood that further mobile communication devices behave in the same way as it is described for the mobile communication device 102 herein.

The mobile communication device 102 regularly performs radio cell measurements in short time intervals in order to determine the strength of a radio signal received from the base station 104a,b of the radio cell 103a,b the mobile communication device 102 camps on. For this purpose, the mobile communication device may monitor a signal strength of a broadcast channel of the radio cell 103a, b. Moreover, under certain conditions the mobile communication device 102 also performs radio cell measurements in further radio cells that are available at its location. Usually, such radio cell measurements are made, if the strength of the radio signal of the radio cell 103a, b the mobile communication device 102 camps on is below a predetermined threshold, and may lead to the reselection of the radio cell 103a,b.

Using the standard procedure in idle mode, the mobile communication device 102 would essentially immediately register in a remaining radio cell 103b, when the radio cell 103a the mobile communication device 102 camps on is deactivated. If plural mobile communication devices 102 are located in a radio cell 103a to be deactivated, extensive signaling traffic would occur essentially simultaneously, when the mobile communication devices register in one of the remaining radio cells 103b leading to a peak signaling load with respect to such radio cells 103b. This can be prevented, when the mobile communication devices 102 follow a different procedure for registering in a new radio cell 103a. One example of such procedure will be explained in the following:

The deactivation of the radio cell 103a is controlled by an operation and maintenance (O&M) unit 108, in the embodiment depicted in FIG. 1. The O&M system 108 initiates the deactivation of the radio cell 103a, after having determined that one or more predefined criteria for deactivating a radio cell 103a are fulfilled. As described before, such criteria may include that the radio cell 103a is deactivated, when the traffic within the radio cell 103a is below a predetermined threshold or when there are no demands for high speed connections within the radio cell 103a. In order to be able to evaluate criteria relying on the traffic in the radio cell 103a, the O&M unit 108 receives information about the connections to mobile communication devices 102 in the radio cell from the base station 104a or another entity in the mobile communication network 100 recording such information.

When the O&M unit 108 has determined, that the relevant criteria are fulfilled, it decides to deactivate the radio cell 103a. Upon this decision, the O&M unit 108 controls the transmission of a deactivation message to the mobile communication devices 102 located within the radio cell 103a to be deactivated. The message is forwarded to the base station 104a serving the radio cell 103a, and the base station 104a broadcasts the deactivation message in the radio cell 103a such that it is received by the mobile communication devices 102 located in the radio cell 103a. In one embodiment a radio cell broadcast service is used for delivering the deactivation message. Here, a Cell Broadcast Centre (CBC) 109 sends the deactivation message to the base station 104a and instructs the base station 104a to transmit the message to the mobile communication devices 102 located in the radio cell 103a served by the base station 104a.

The deactivation message notifies the mobile communication devices 102 located in the radio cell 103a about a forthcoming deactivation of the radio cell 103a. It includes a guard time T, which may be specified by the O&M system 108 and which will be explained below.

In addition, the deactivation message may include a list of RATs to be used, after the radio cell 103a has been deactivated. The list may include the RATs implemented by the radio cell(s) 103b remaining active in the geographic area of the radio 103a, when this radio cell is deactivated. If there remains only one radio cell 103b providing certain RAT or if the remaining radio cells 103 implement the same RAT, the RAT of the radio cell(s) 103 may be included in the list. If plural remaining radio cells 103b implement different RATs, the list includes the RAT provided by such radio cells 103b. Preferably, the RATs are included in the list with different priorities that determine the order in which a mobile communication device tries to register in new radio cells providing different RATs. The order of the priorities may correspond to the bandwidth and/or service quality the RATs provide, where the RATs providing higher bandwidth and/or service quality have higher priorities. The list may be generated by the O&M unit 108 based on the structure of the RAN 101 in the geographic region of the radio cell 103a to be deactivated, which may be evaluated in order to determine the RATs supported by the remaining radio cells 103a.

In addition, the deactivation message may include a list of RATs to be used, after the radio cell 103a has been deactivated. The list may include the RATs implemented by the radio cell(s) 103b remaining active in the geographic area of the radio cell 103a, when this radio cell 103a is deactivated. If there remains only one radio cell 103b providing certain RAT or if the remaining radio cells 103 implement the same RAT, the RAT of the radio cell(s) 103 may be included in the list. If plural remaining radio cells 103b implement different RATs, the list includes the RAT provided by such radio cells 103b. Preferably, the RATs are included in the list with different priorities that determine the order in which a mobile communication device tries to register in new radio cells providing different RATs. The order of the priorities may correspond to the bandwidth and/or service quality the RATs provide, where the RATs providing higher bandwidth and/or service quality have higher priorities. The list may be generated by the O&M unit 108 based on the structure of the RAN 101 in the geographic region of the radio cell 103a to be deactivated, which may be evaluated in order to determine the RATs supported by the remaining radio cells 103a.

According to the predetermined routine, the mobile communication device reads the guard time T from the deactivation message and randomly selects based thereon a time interval TI(T). The time interval TI(T) may be generated using a random algorithm such that it has a length less than or equal to the guard time T. Thus, the guard time T is used as an upper boundary, when calculating the time interval. The random algorithm may use a number as an input parameter, which is different for each mobile communication device 102. In one embodiment, a number is used which is uniquely assigned to the mobile communication device 102 and stored therein, particularly the international mobile subscriber identity (IMSI).

After having randomly generated the time interval TI(T), the mobile communication device 102 starts at a predetermined point in time a timer counting the time interval TI(T). When the timer indicates that the time interval TI(T) has expired, the mobile communication device registers in a selected radio cell 103b remaining active at its location after the former radio cell 103a has been deactivated. In one embodiment, the point in time to start the timer corresponds to the point in time, when the mobile communication device determines that the radio cell 103a is deactivated due to one of the regular radio cell measurements.

In further embodiments, the timer may already be started, as soon as the time interval TI(T) is calculated or the deactivation message additionally specifies the point in time, when to start the timer. In these embodiments, the mobile communication device 102 may register in a new radio cell 103b before the current radio cell 103a is deactivated. These may shorten the time period in which the mobile communication device is not registered with the mobile communication network 101. However, the new radio cell 103a has to be made available in the geographic area of the radio cell 103a to be deactivated in sufficient time before the deactivation, if the new radio cell 103a covers this geographic area only temporarily. Furthermore, it has to be prevented that the mobile communication device 102 again selects radio cell 103a before it is deactivated, if it performs a standard radio cell measurement and reselection procedure before the deactivation. This can be achieved by temporarily excluding the radio cell 103a from the radio cell measurements.

When plural mobile communication devices 102 camp on the radio cell 103a to be deactivated, the mobile communication devices 102 calculate different time intervals TI(T) due to the random generation of the time intervals TI(T). As a consequence, the mobile communication devices 102 register with the mobile communication network 100 in a new radio cell 103a not simultaneously, but in different points in time. In particular, the mobile communication devices 102 register with the mobile communication network 100 in points in time which are distributed randomly within a time period corresponding to the guard time T. Thus, the guard time T influences the time distance between the registration procedures performed by different mobile communication devices 102. In order to allow for a quick registration in a new radio cell 103b on the one hand and to have sufficiently large time intervals between the registration procedures, the O&M unit 108 may adapt the guard time T to an estimated number of mobile communication devices 102 camping on the radio cell 103a (i.e. the corresponding tracking area) to be deactivated. Particularly, the O&M unit 108 may specify a greater guard time T, when there are more mobile communication devices 102 located in the radio cell 103a.

The selection of the new radio cell 103a may be made based on radio cell measurements in the remaining radio cells 103b and may be made, when the timer indicates the expiration of the time limit TI(T). Such radio cell measurements are performed with respect to radio cells 103b providing the RATs given in the list included in the deactivation message and the mobile communication device 102 may not try to make radio cell measurements with respect to RATs included in the list. If the list specifies more than one RAT, the mobile communication device 102 registers in a radio cell 103a of the RAT with the highest priority, which provides a sufficiently high signal level and in which the registration is performed successfully.

In one embodiment, the mobile communication device successively performs radio cell measurements with respect to the specified RATs in the order of the priorities until it can register in a radio cell 103b supporting one of these RATs and providing a sufficiently high signal level. Thus, the mobile communication device initially performs radio cell measurements with respect to the RAT having the highest priority and tries to register in a radio cell providing this RAT, if such radio cell is detected and provides sufficiently high signal strength. If no such radio cell is detected or the mobile communication device 102 cannot register in such radio cell, the mobile communication device 102 successively performs radio cell measurements with respect to the RATs having lower priorities until a radio cell 103b providing a sufficiently high signal level is detected and the registration in the radio cell 103b is successful.

A similar list may be stored in the mobile communication device 102 and may be used for the selection of a RAT by default, e.g. when selection a mobile communication network to register in after being switched on. This list may include other RATs and/or other priorities. When registering in a mobile communication network after the deactivation of a radio cell 103a, the default list may not be used, but the list included in the deactivation message. Thus, the RAT selection can be influenced such that another RAT is selected than it would be by default.

Beyond the time-based selection of a new radio cell 103b and the registration therein, there may be further procedures initiated in the mobile communication device 102 upon receipt of the deactivation message. In one embodiment, the mobile communication device 102 may block the initiation of mobile-originating speech and/or data connections, after the deactivation message is received or after a point in time specified in the deactivation message is reached, which has a sufficient time distance to the deactivation. Hereby, it is prevented that within certain time period before the deactivation of the radio cell 103a, a mobile-originating connection is initiated which may have to be switched over to a new radio cell 103b by a handover procedure. Thus, the number of handovers is reduced which become necessary due to the deactivation of the radio cell 103a and which require extensive signaling between the relevant mobile communication devices 102 and the mobile communication network 100 and within the mobile communication network 100.

After having registered in the new radio cell 103b, the mobile communication device 102 camps on this radio cell 103b in idle mode. Within the new radio cell 103b, the mobile communication device 102 may behave according to the standard procedures provided for the idle mode (with the exception, that the radio cell to be deactivated may be temporarily excluded from radio cell measurements as described above). In particular, the mobile communication device 102 allows initiating mobile-originating speech and data connections again, if the initiation of such connections has been blocked before.

In addition to the mobile communication devices 102, the O&M unit 108 may notify components of the CN 105, when a radio cell 103a will be deactivated. In particular, the mobility management unit 106 may be notified and may mark the mobile communication devices 102 located in the tracking area comprising the relevant radio cell 103a as implicitly detached within its database. In addition, the registration server 107 may be informed, which mobile communication devices 102 are located within the tracking area and may mark the relevant mobile communication devices 102 accordingly within the database records assigned to the mobile communication devices 102. If the tracking area only consists of the radio cell 103a to be deactivated, only those mobile communication devices 102 in the relevant cell are marked as implicitly detached.

The marking of the mobile communication device 102 in the mobility management unit 106 may be deleted, when the mobility management unit 106 has determined that the mobile communication device 102 has successfully registered in a new radio cell 103b. Upon the determination of such event, the mobility management unit 106 may also inform the registration server 107 and the registration server 107 may also delete the marking of the relevant mobile communication device 102 in its database. In addition or as an alternative, mobility management unit 106 and/or the registration server 107 may delete the markings of the mobile communication devices, when the radio cell 103a has been deactivated.

When a mobile communication device 102 is engaged in an active speech and/or data connection, the connection is switched over to a new radio cell 103a remaining active at the location of the mobile communication device. For this purpose, a handover procedure is performed which as such is known to person skilled in the art. The handover procedure may be initiated by the mobility management unit 106, after it has received the notification that the radio cell 103a will be deactivated.

For mobile communication devices 102 which are located in the radio cell 103a to be deactivated and which are in idle mode, paging is blocked in one embodiment, after the O&M unit 108 has issued the notification that the radio cell 103a will be deactivated or after a point in time the deactivation specified in the notification and having a sufficient time distance to the deactivation. For this purpose, the mobility management unit 106 checks, if the relevant mobile communication device is marked as implicitly detached within its database. The mobile communication device 102 is paged only, if this is not the case. If the mobile communication device 102 is marked as implicitly detached, the request is denied by the mobility management unit 102.

If a request to the registration server 102 is made in order to determine the mobility management unit 102 serving the mobile communication device 102 to which the connection is to be established, the registration server 102 may similarly check, if the mobile communication device 102 is marked as camping on a radio cell 102 to be deactivated. If this is determined, the registration may reject the request, otherwise the registration server determines the mobility management unit 106 to which the connection request is to be forwarded. Thus, when the mobile communication devices are also marked as detached in the registration server 106, requests for establishing connections to such mobile communication device can be reject early, without having to forward such request to the responsible mobility management unit 106. Hereby, the mobility management unit 106 is disburdened and signaling traffic within the CN 105 is reduced.

By blocking the paging of mobile communication devices 102 located in the radio cell 103a to be deactivated, it is prevented that within certain time period before the deactivation of the radio cell 103a, a mobile-terminating connection is initiated which may have to be switched over to a new radio cell 103b by a handover procedure. Thus, the number of handovers which become necessary due to the deactivation of the radio cell 103a is again reduced as it is achieved by blocking the initiation of mobile-originating speech and/or data connections within the mobile communication devices 102.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. Any reference signs in the claims should not be construed as limiting the scope.

What is claimed is:

1. A method for a mobile communication device registering in a second radio cell of a mobile communication network based on a deactivation of a first radio cell the mobile communication device was located in, the method comprising:
    determining a random time interval by the mobile communication device,
    determining an expiration of the random time interval starting from a predetermined point in time;
    registering in the second radio cell, before deactivation of the first radio cell, when the expiration of the random time interval has been determined; and
    temporarily preventing selection of the first radio cell after registering in the second radio cell.

2. The method recited in claim 1, comprising determining the random time interval after having received a predetermined message from the mobile communication network.

3. The method recited in claim 2, wherein the random time interval is randomly selected based on a time T indicated in the predetermined message.

4. The method recited in claim 1, wherein the predetermined point in time corresponds to a point in time, when the mobile communication device determines that the first radio cell is no longer available.

5. The method recited in claim 1, wherein the predetermined point in time corresponds to the point in time, when the message is received in the mobile communication device, and/or the predetermined point in time being specified in the message.

6. The method recited in claim 1, wherein within a time period before the deactivation of the first radio cell, the mobile communication network rejects requests for establishing speech and/or data connections terminating at the mobile communication device.

7. The method recited in claim 1, wherein the predetermined message includes a list of radio access technologies with different priorities, the mobile communication device selecting the second radio cell such that it implements a radio access technology included in the list in accordance with the different priorities.

8. The method recited in claim 1, wherein the traffic in the first radio cell is below a predetermined threshold.

9. The method recited in claim 1, wherein selection of the first radio cell after registering in the second radio cell is prevented by temporarily excluding the first radio cell from radio cell measurements.

10. A method for a mobile communication device registering in a second radio cell of a mobile communication network based on a deactivation of a first radio cell the mobile communication device was located in, the method comprising:
    determining a random time interval by the mobile communication device,
    determining an expiration of the random time interval starting from a predetermined point in time;
    registering in the second radio cell, when the expiration of the random time interval has been determined; and
    blocking the paging of the mobile communication device located in the first radio cell after having received the message notifying about the deactivation of the first radio cell within a certain time period before deactivation of the first radio cell such that a number of handovers caused by deactivation of the first radio cell is reduced.

11. A mobile communication device configured to register in a second radio cell of a mobile communication network based on a deactivation of a first radio cell the mobile communication device was located in, the mobile communication device being configured to randomly select a time interval and to determine the expiration of a time interval starting from a predetermined point in time, and the mobile communication device is configured to block paging of the communication device during the selected time interval and within a certain time period before deactivation of the first radio cell such that a number of handovers caused by deactivation of the first radio cell is reduced, and the mobile communication being further configured to register in the second radio cell only after the expiration of the time interval has been determined, if it has been registered in first radio cell before.

12. The mobile communication device recited in claim 11, being further configured to randomly determine the time interval after having received a predetermined message from the mobile communication network.

13. The mobile communication device recited in claim 12, being further configured to randomly determine the time interval based on a time T indicated in the predetermined message.

14. The mobile communication device recited in claim 12, being further configured to block an initiation of mobile-originating speech and/or data connections after having received the predetermined message notifying about the deactivation of the first radio cell.

* * * * *